J. E. MATHYS.
MOLDING MACHINE.
APPLICATION FILED SEPT. 25, 1911.
1,032,415.
Patented July 16, 1912.
2 SHEETS—SHEET 2.
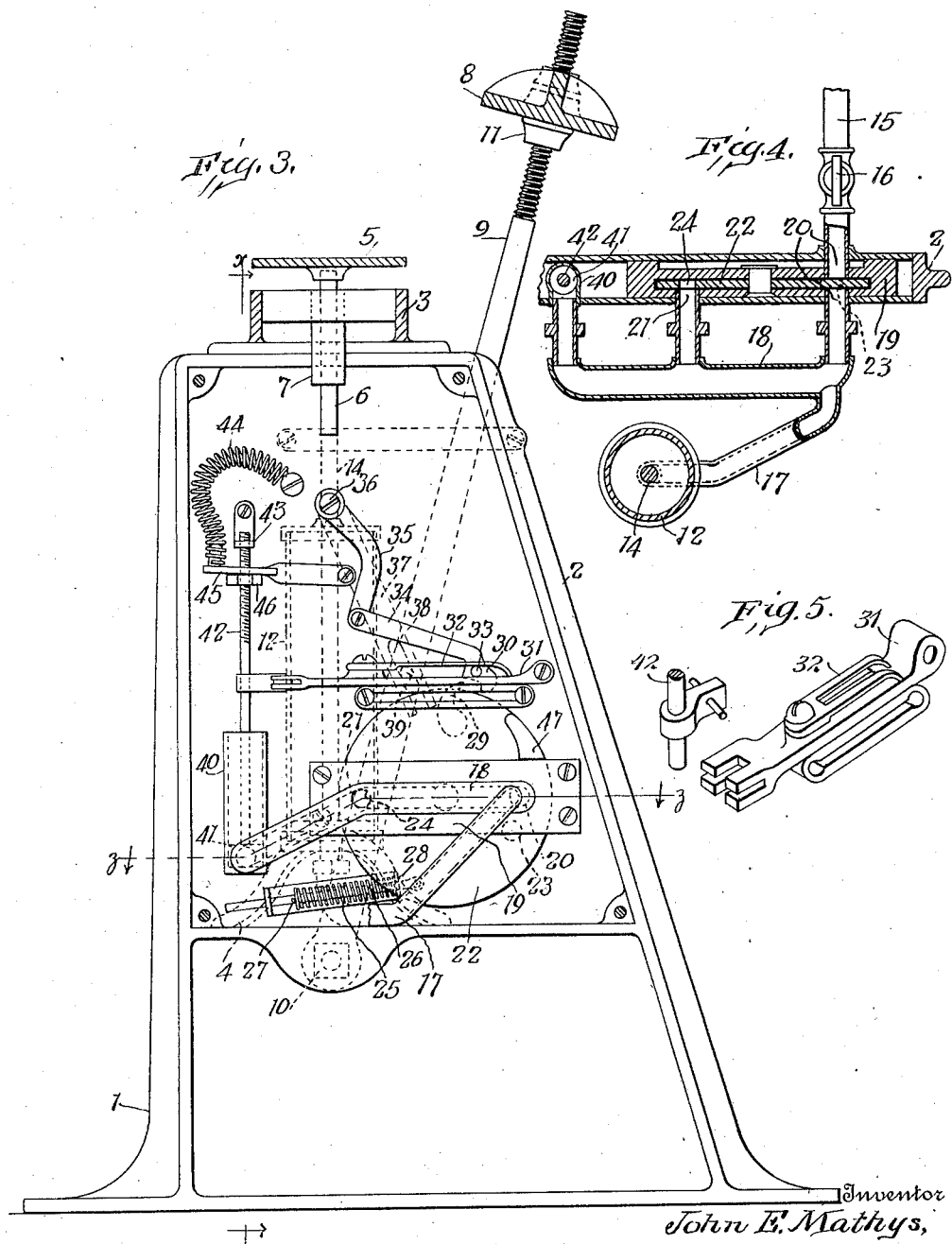
Witnesses
G. Howard Walmsley.
F. W. Schaefer.
Inventor
John E. Mathys,
By Toulmin & Reed
Attorneys

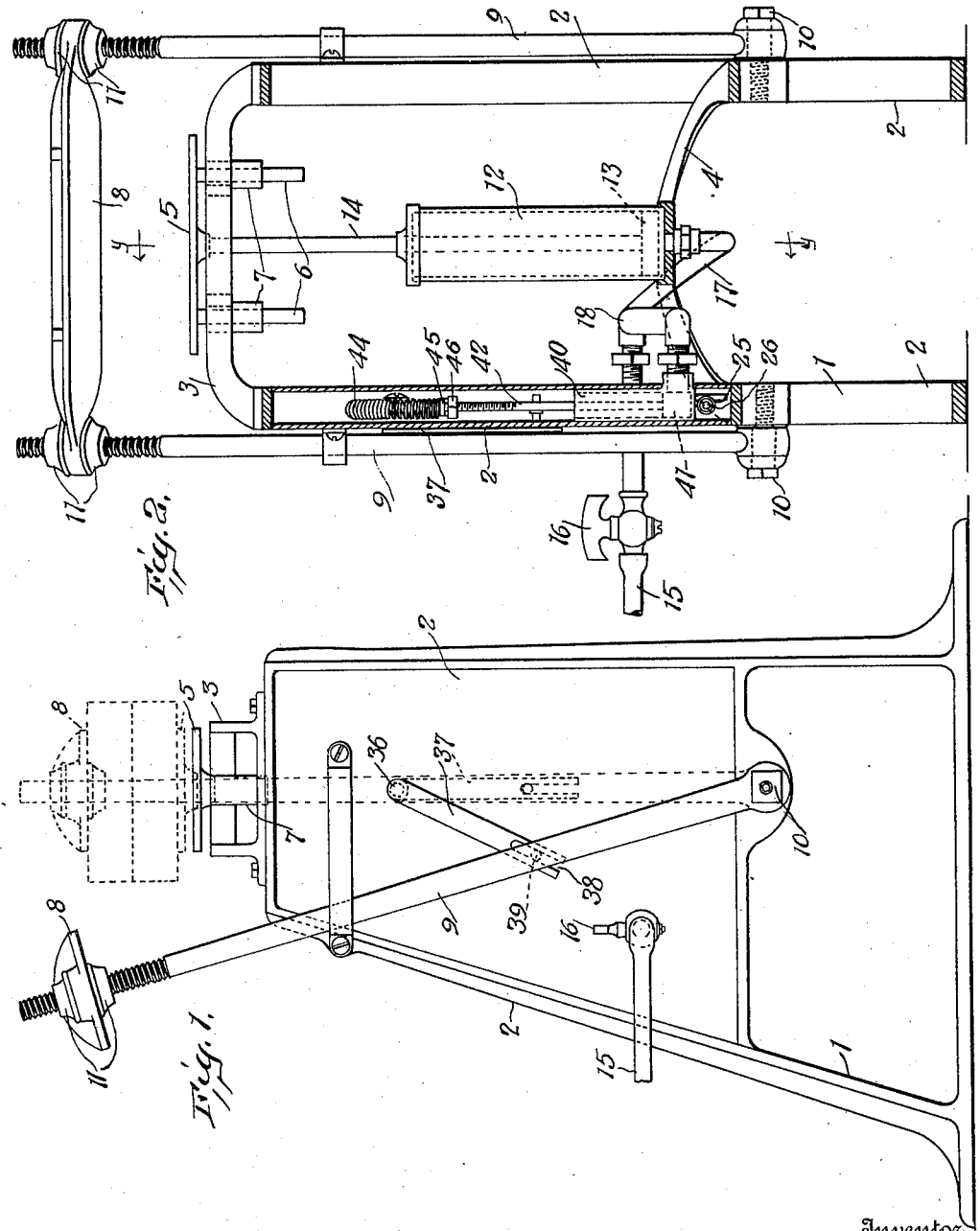

UNITED STATES PATENT OFFICE.

JOHN E. MATHYS, OF SPRINGFIELD, OHIO.

MOLDING-MACHINE.

1,032,415.

Specification of Letters Patent.   Patented July 16, 1912.

Application filed September 25, 1911.   Serial No. 651,011.

*To all whom it may concern:*

Be it known that I, JOHN E. MATHYS, a citizen of the United States, residing at Springfield, in the county of Clark and State of Ohio, have invented certain new and useful Improvements in Molding-Machines, of which the following is a specification, reference being had therein to the accompanying drawing.

This invention relates to molding machines and more particularly to that type of machine comprising two members, one of which is movable toward the other to compress the mold between them, and in which one of the members is movable transversely to the line of the first-mentioned movement to enable the mold to be placed in position between the two members.

The objects of the invention are, first, to produce a molding machine having power-actuated operating mechanism which will be controlled by said transverse movement and will be actuated only when the two members are in their operative positions or approximately so: second, to produce a machine with means for automatically cutting out the power-actuated operating mechanism and relieving the pressure on the mold when this pressure has reached the desired degree; and third, to produce such a machine which will be simple in construction and in which the controlling mechanism will be protected, thus providing a machine which will not be liable to injury by any rough handling it may receive in the foundry.

In the accompanying drawings, Figure 1 is side elevation of a machine embodying my invention; Fig. 2 is a sectional view, taken on the line $x$ $x$ of Fig. 3 and looking in the direction of the arrows; Fig. 3 is a vertical section taken on the line $y$ $y$ of Fig. 2 and looking in the direction of the arrows; Fig. 4 is a transverse, sectional view taken on the line $z$ $z$ of Fig. 3 and looking in the direction of the arrows; and Fig. 5 is a detail of the connection forming a part of the automatic releasing device.

In these drawings I have illustrated one embodiment of my invention and have shown the same as comprising a frame 1 which preferably consists of side members 2 spaced apart and connected at their upper ends by a transverse member or arch 3 and at their lower ends by a spider 4 which, as will hereinafter appear, has a function in addition to the function of a connecting member. The mold compressing members are carried by this frame, and, in the type of machine here shown these members are arranged one above the other and one of the members is capable of movement toward and away from the other to compress the molds between them. One of the members, preferably the other member, has movement transversely to the line of movement of the first-mentioned member, thereby enabling it to be moved out of alinement with the first-mentioned member and the mold to be placed in position between the two members. In the present form of the device the lower member, which is indicated at 5, constitutes the bottom or supporting plate for the flask and is movable vertically. This bottom plate may be supported on the frame in any suitable manner, but, as here shown, it has secured thereto depending rods or pins 6 which are slidably mounted in bearings 7 carried by the transverse frame member or arch 3. The second member, which is indicated at 8, comprises the lid of the flask and is movable laterally to carry the same into a position which will permit the mold to be placed upon the bottom plate 5. To permit this lateral movement the plate 8 is preferably mounted on two arms 9, the lower ends of which are journaled on stud shafts 10 carried by the respective side members 2. To enable the lid to be adjusted to different heights to accommodate flasks of various depths I have screw-threaded the upper ends of the rods 9 and have mounted the lid 8 loosely on the screw-threaded portions of these rods. Nuts 11 are mounted on the rods above and below the plate to support the same in adjusted positions.

Movement may be imparted to the bottom plate 5 by power mechanism of any suitable character. I prefer to provide controlling means for this power mechanism, which controlling means will be actuated by the swinging movement of the top plate to start the operation of said power mechanism just as the lid moves into its operative position relatively to the bottom plate, that is, into position directly above the same. I have found fluid-actuated mechanism well adapted to the purposes of this machine and have shown the present machine as provided with a fluid cylinder 12 mounted on the spider 4 and provided with a piston 13 and piston rod 14, which latter is connected at its upper end with the bottom plate 5. This fluid cylinder is connected with a suitable source of supply for fluid under presssure, such, for example, as the compressed air system commonly employed in factories. As this source of compressed fluid forms no part of the present invention I have not shown the same but have simply indicated a connecting hose 15 provided with a cut-off valve 16. The fluid-actuated mechanism has valve-controlling inlet and exhaust ports and the valve, or valves, controlling these ports may be so connected with the lid that when the lid is in its operative position above the bottom plate its inlet port will be opened and the exhaust port closed, and, when the lid has been moved into its inoperative position, the exhaust port will be opened and the inlet port closed. Preferably, the character and arrangement of the controlling valves are such that the exhaust port will not be entirely closed until the lid has been moved almost to its operative position. So long as the exhaust port is open even to a limited extent the fluid pressure within the cylinder 12 will not be sufficient to move the bottom plate, and, consequently, there will be no movement of the bottom plate until the parts are in their proper operative positions. In the particular construction here illustrated the cylinder 12 has connected thereto a single pipe 17 which constitutes both the inlet and exhaust pipe. This pipe 17 is connected with the inlet and exhaust ports by means of a manifold 18. The inlet and exhaust ports are here shown as both formed in a single housing 19, the inlet port being indicated at 20 and the exhaust port at 21. The inlet port communicates on the opposite side of the housing with a source of fluid supply, as indicated by the supply pipe 15, while the exhaust port communicates with the atmosphere. This housing is preferably carried by one of the side walls of the main frame, and, in the present instance, that side member which carries the housing is provided with side plates spaced apart to receive the housing and the other controlling mechanism between them, thus confining these parts within the side member of the frame in a manner which will effectually protect them from injury. The housing which, in effect, constitutes a double valve casing, has rotatably mounted therein a disk-like valve member 22 provided with openings 23 and 24 adapted to register respectively with ports 20 and 21. It will be noted that these openings are not arranged on diametrically opposite sides of the disk but are offset in such a manner that when the opening 24 is in alinement with its port, 21, the opening 23 will be out of alinement with its port, 20, and vice versa. The arrangement is such, however, that the opening of the one port will begin at the same time that the other port begins to close.

The disk 22 is held in its normal position, that is, in a position with the opening 24 in alinement with the port 21, by means of a spring 25 which is here shown as coiled about a rod 26, which is pivotally connected at one end to the disk, and confined between a stop 27 on the rod and a second stop 28 on a fixed part of the frame. The rod 26 extends through an opening in the stop 28 of a size sufficient to allow the rod to accommodate itself to the movements of that end thereof which is connected to the disk 22. A suitable connection is established between the arms 9 which carry the lid 8 and the valve disk 22 to cause this disk to be rotated a distance sufficient to move the opening 23 into alinement with the port 20 each time the lid is moved into its operative position. To this end the disk is shown as provided with a lug or hook 29 secured to one side thereof and adapted to be engaged by a pawl 30. This pawl, as here shown, is slidably mounted on a bar 31 having a spring 32 secured at one end thereto and spaced away therefrom to form a guide within which guide pins or lugs 33 carried by the pawl 30 may travel. The resilient bar or spring 32 constituting the upper portion of the guide permits the pawl to ride over the projection 29 when it is returned to its normal position.

The pawl 30 has an elongated portion or arm 34 which is pivoted at one end to a link 35, the other end of which is rigidly secured to a short shaft 36 journaled in the frame member 2 and having rigidly secured to its other end an arm 37 having at its lower end a slot 38 to receive a pin 39 carried by the adjacent arm 9. It will be apparent, therefore, that as the lid is moved into and out of its operative position transverse movement will be imparted to the pawl, and, when the movement of the lid is toward its operative position the pawl will engage the projection 29 and impart rotary movement to the disk. I have also provided means, whereby, when the desired degree of pressure has been exerted upon the mold the power-actuated mechanism will be cut out to relieve the pressure. This I accomplish in the present machine by the use of a supplemental cylinder 40 connected at its lower end with the manifold 18 and having mounted therein a piston 41 having a piston rod 42, the upper end of which is loosely mounted in a guide 43 and the upward movement of which is resisted by means of a spring 44. Any suitable spring may be employed for this purpose but I have here employed a coiled spring bent into a substantially semicircular form. One end of this spring is secured at a fixed point on the main frame and the other end is secured to an arm 45 which is pivotally mounted on the main frame and has an opening through which the piston rod 42 extends loosely. A nut 46 screw-threaded onto the upper end of the rod beneath the arm 45 determines the point of connection between the rod and the spring, and, by varying this point of connection, the tension of the spring may be regulated. The piston rod 42 is connected with the free end of the pivoted bar 31 which guides the pawl 30 and upon which the projection or lug 33 of the pawl rests. When the piston rod is moved upward this bar will be moved about its pivotal center and the pawl moved out of engagement with the pawl 29 on the disk, thereby permitting the spring 25 to return the disk to its normal position, this movement being limited by a suitable stop 47 secured to the disk and adapted to engage the valve housing 19.

In the operation of the device the amount of pressure to which the mold is to be subjected is determined beforehand and the spring 44 which resists the upward movement of the piston rod 42 is regulated to correspond to the pressure to which it is desired to subject the mold. When the inlet valve is open the manifold 18 is connected with the source of fluid supply and is in open communication with both the cylinder 12 and the cylinder 40. The resistance offered to the piston of the cylinder 40 is fixed but the resistance offered to the piston of the cylinder 12, which carries the bottom plate 5, gradually increases as the sand of the mold is compressed more and more. When this compression has progressed to such a point that the resistance offered to the movement of the bottom plate is greater than the resistance offered to the movement of the piston 41 in the cylinder 40 the piston 41 will be actuated, thereby releasing the pawl and permitting the valve disk to be rotated to close the inlet port and open the exhaust port. With this machine the only action necessary on the part of the operator is to place the mold upon the bottom plate and move the lid into operative position, allow the same to remain there until the compression is completed and then move the lid into its inoperative position. In addition to its labor saving quality and the speed with which the work can be performed the machine has the further advantage of imparting a uniform degree of compression to each mold, and further, it can be adjusted to regulate the amount of compression so imparted. The machine itself is very simple in its construction and operation and all parts which are at all delicate or in any way liable to be disarranged or broken are completely housed and adequately protected from injury.

While I have herein shown and described one form of mechanism embodying my invention I wish it to be understood that this particular form has been chosen for the purposes of illustration and that I do not wish to be limited to the details of construction shown and described, for obvious modifications will occur to a person skilled in the art.

Having thus fully described my invention, what I claim as new and desire to secure by Letters Patent is:—

1. In a machine of the character described, the combination, with a bottom plate and a lid, one of said members having movement toward and away from the other, and one of said members having movement in a line extending at an angle to the line of the first-mentioned movement, of power actuated mechanism to accomplish one of said movements, and an automatic controlling device actuated by the other of said movements to cause the operation of said power actuated mechanism.

2. In a machine of the character described, the combination, with a bottom plate, and a lid, one of said members having movement toward and away from the other, and one of said members having movement in a line extending at an angle to the line of the first-mentioned movement, of fluid-actuated mechanism to accomplish one of said movements, said mechanism comprising valve controlled inlet and exhaust ports, means controlled by the other of said movements to open the inlet valve, and automatically controlled means to open the exhaust valve.

3. In a machine of the character described, the combination, with a bottom plate and a lid arranged one above the other, one of said members having movement in a substantially vertical line and the other of said members having movement in a line extending at an angle to the vertical, of fluid-actuated mechanism to actuate that member having vertical movement, and automatic means controlled by the movement of the other member to admit fluid to said fluid-actuating mechanism and cause the operation thereof.

4. In a machine of the character described, the combination, with a bottom plate and a lid arranged one above the other, one of said members having movement in a substantially vertical line and the other of said members having movement in a line extending at an angle to the vertical, of means controlled by the movement of the last-mentioned member to cause the first-mentioned member to move in one direction, and automatically controlled means to cause said first-mentioned member to be moved in the other direction.

5. In a machine of the character described, the combination, with a bottom plate and a lid arranged one above the other, one of said members having movement in a substantially vertical line and the other of said members having movement in a line extending at an angle to the vertical, of fluid actuated mechanism to impart movement to said vertically movable member, said mechanism having valve-controlled inlet and exhaust ports, means actuated by the movement of the last-mentioned member to open said inlet port, and automatically controlled means to open said exhaust port.

6. In a machine of the character described, the combination, with a bottom plate and a lid arranged one above the other, one of said members having movement in a substantially vertical line and the other of said members having movement in a line extending at an angle to the vertical, of fluid actuated mechanism to impart movement to said vertically movable member, said mechanism having valve-controlled inlet and exhaust ports, means actuated by the movement of the last-mentioned member to open said inlet port, and means controlled by the resistance offered to the movement of said vertically movable member to open said exhaust port.

7. In a machine of the character described, a main frame, a bottom plate movably mounted on said main frame, a fluid cylinder supported by said frame, a piston mounted in said cylinder and connected with said bottom plate, arms pivotally mounted on said frame, a lid carried by said arms and capable of movement into and out of a position above said bottom plate, a valve to admit fluid to said cylinder, and a connection between said valve and one of said arms to cause the operation of said piston when said lid is moved into a position above said bottom plate.

8. In a machine of the character described, a main frame, a bottom plate movably mounted on said main frame, a fluid cylinder supported by said frame, a piston mounted in said cylinder and connected with said bottom plate, arms pivotally mounted on said frame, a lid carried by said arms and capable of movement into and out of a position above said bottom plate, valve mechanism to control the admission and exhaust of fluid to and from said cylinder, a connection between said valve mechanism and one of said arms to cause the fluid to be admitted to said cylinder when said lid is moved into a position above said bottom plate, and means to automatically actuate said valve mechanism to permit the fluid to escape from said cylinder.

9. In a machine of the character described, a main frame, a bottom plate movably mounted on said main frame, a fluid cylinder supported by said frame, a piston mounted in said cylinder and connected with said bottom plate, arms pivotally mounted on said frame, a lid carried by said arms and capable of movement into and out of a position above said bottom plate, valve mechanism to control the admission and exhaust of fluid to and from said cylinder, a connection between said valve mechanism and said lid to actuate said valve mechanism to admit the fluid to said cylinder when said lid is moved into position above said bottom plate, means to interrupt said connection when the pressure in said cylinder exceeds a predetermined degree, and means to actuate said valve mechanism, when said connection has been interrupted, to permit the fluid to escape from said cylinder.

10. In a machine of the character described, a main frame, a bottom plate movably mounted on said main frame, a fluid cylinder supported by said frame, a piston mounted in said cylinder and connected with said bottom plate, arms pivotally mounted on said frame, a lid carried by said arms and capable of movement into and out of a position above said bottom plate, valve mechanism to control the admission and exhaust of fluid to and from said cylinder, a connection between said valve mechanism and said lid to actuate said valve mechanism to admit the fluid to said cylinder when said lid is moved into position above said bottom plate, a fluid actuated device mounted in operative relation to said connection, and a resilient device to control the movement of said fluid-actuated device.

11. In a machine of the character described, a main frame, a bottom plate, and a lid carried by said main frame, one of said members being movable toward and away from the other, and the other of said members being movable toward and away from the line of movement of the first-mentioned member, a fluid-actuated device operatively connected with the first-mentioned member and communicating with a source of fluid supply, valve mechanism to control the admission and exhaust of fluid to and from said device, a connection between said valve mechanism and the last-mentioned member, whereby said valve mechanism is actuated when said member is moved toward the line of movement of the first-mentioned member, a second fluid-actuated device mounted in operative relation to said connection and communicating with said source of fluid supply between the first-mentioned fluid-actuated device and the valve mechanism, and a resilient device to receive the movement of said second fluid-actuated device.

12. In a machine of the character described, a supporting frame, a bottom plate and a lid carried by said frame, one of said members being movable in a substantially vertical line and the other of said members being movable transversely to said vertical line, a cylinder carried by said frame, a piston mounted in said cylinder, connected with said first-mentioned member and communicating with the source of fluid supply, valve mechanism interposed between said cylinder and said source of fluid supply and comprising a disk-like valve member having a tooth, a pawl movably mounted on said frame, adapted to engage said tooth and operatively connected with said transversely movable member, a second fluid-actuated cylinder carried by said frame and communicating with said source of fluid supply, a piston mounted in said cylinder, an operative connection between said piston and said pawl, and a spring to resist the movement of said last-mentioned piston.

13. In a machine of the character described, a supporting frame, a bottom plate and a lid carried by said frame, one of said members being movable in a substantially vertical line and the other of said members being movable transversely to said vertical line, a cylinder carried by said frame, a piston mounted in said cylinder, connected with said first-mentioned member and communicating with the source of fluid supply, valve mechanism interposed between said cylinder and said source of fluid supply and comprising a disk-like valve member having a tooth, a pawl movably mounted on said frame, adapted to engage said tooth and operatively connected with said transversely movable member, a second fluid-actuated cylinder carried by said frame and communicating with said source of fluid supply, a piston mounted in said cylinder, an operative connection between said piston and said pawl, a spring to resist the movement of said last-mentioned piston, and means to regulate the tension of said spring.

14. In a machine of the character described, a supporting frame, a bottom plate and a lid carried by said frame, one of said members being movable in a substantially vertical line and the other of said members being movable transversely to said vertical line, a cylinder carried by said frame, a piston mounted in said cylinder, connected with said first-mentioned member and communicating with the source of fluid supply, valve mechanism interposed between said cylinder and said source of fluid supply and comprising a disk-like valve member having a tooth, a pawl movably mounted on said frame, adapted to engage said tooth and having a lateral projection, a substantially horizontal bar pivotally mounted on said frame and forming a support for said lateral projection, a flat spring extending parallel with said bar above said projection and connected to said bar at one end, a connection between said pawl and said transversely movable member, whereby the movement of said member will cause said pawl to travel on said bar, a second cylinder mounted on said frame and connected with said source of fluid supply, a piston mounted in said cylinder and connected with said pivoted bar, and a spring to resist the movement of said last-mentioned piston.

15. In a machine of the character described, a bottom plate and a lid, one of said members being movable toward and away from the other and the other of said members being movable transversely to the line of movement of the first-mentioned member, a fluid actuated device carried by said frame and connected with said first-mentioned member, valve mechanism comprising inlet and exhaust ports and operatively connected with said transversely movable member, a second fluid actuated device, a manifold communicating with said inlet port and in open communication with both of said fluid-actuated devices and said exhaust port, means controlled by the last-mentioned fluid-actuated device to interrupt the connection between said valve mechanism and said transversely movable member, and a spring to resist the movement of said last-mentioned valve actuating device.

16. A machine of the character described comprising a main frame, a bottom plate and a lid carried by said main frame, one of said members being movable in a substantially vertical line and the other of said members being movable transversely to said vertical line, a fluid-actuated device carried by said frame and operatively connected to said vertically movable device, valve mechanism to control the admission and exhaust of fluid to and from said fluid actuated device, a connection between said valve mechanism and said transversely movable member, whereby the movement of said member will cause the fluid to be admitted to said fluid-actuated device, a second fluid-actuated device communicating with the source of fluid supply, means controlled by said second fluid-actuated device to actuate said valve mechanism and interrupt the admission of fluid to said first-mentioned fluid-actuating device and to permit the fluid to escape therefrom, and a device to resist the movement of said second fluid-actuated device.

17. In a machine of the character described, a main frame comprising side members, and connections between said side members, one of said side members having face plates on the opposite sides thereof to form a housing within the same, a bottom plate movably mounted on said frame, a lid mounted on said frame and movable transversely to the line of movement of said bottom plate, a fluid-actuated device operatively connected to said bottom plate, valve mechanism to control said fluid-actuated device arranged within said housing, an operative connection between said valve mechanism and said lid, a second fluid-actuated device mounted within said housing, and means controlled by said second fluid actuated device to interrupt the connection between said valve mechanism and said lid.

In testimony whereof, I affix my signature in presence of two witnesses.

JOHN E. MATHYS.

Witnesses:
 THURSTON W. LUDLOW,
 W. C. KENNEDY.

Copies of this patent may be obtained for five cents each, by addressing the "Commissioner of Patents, Washington, D. C."